Oct. 25, 1955

A. J. A. SAUSSARD 2,721,629

VACUUM MEANS FOR BRAKING VEHICLES
EQUIPPED WITH A DIESEL ENGINE

Filed May 2, 1949

INVENTOR
ANDRÉ J.A. SAUSSARD by Wilkinson & Mawhinney
Attys.

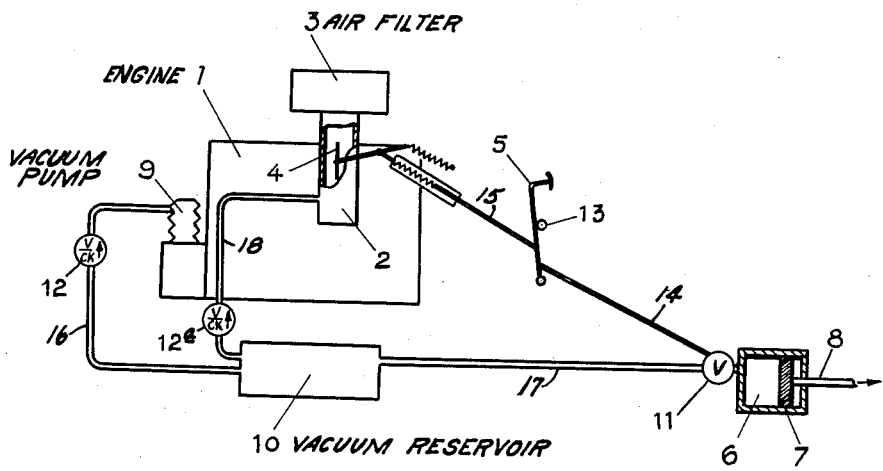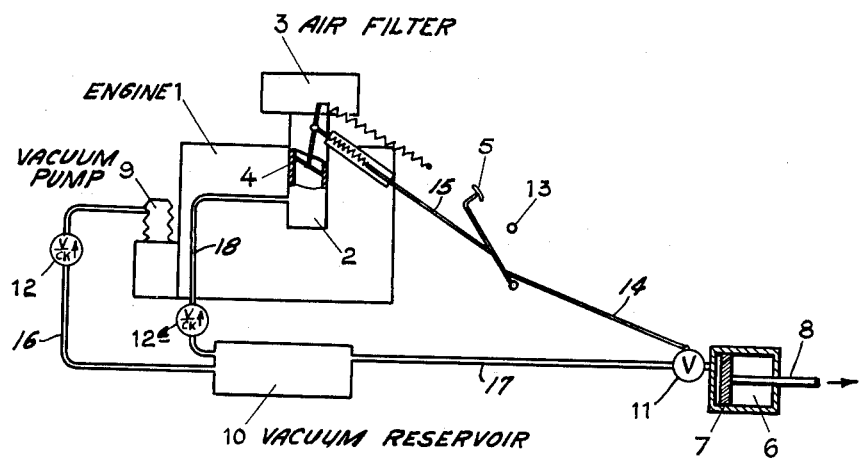

United States Patent Office 2,721,629
Patented Oct. 25, 1955

2,721,629

VACUUM MEANS FOR BRAKING VEHICLES EQUIPPED WITH A DIESEL ENGINE

André Jean Auguste Saussard, Paris, France, assignor to Lignes Telegraphiques et Telephoniques, Conflans-Sainte-Honorine, France, a joint-stock company of France Application May 2, 1949, Serial No. 90,991

Claims priority, application France May 12, 1948

3 Claims. (Cl. 188—152)

The present invention relates to an improved device for braking vehicles, such as trucks, tractors, railway diesel engines and the like, equipped with internal combustion engines, of the diesel type.

This device can be applied equally well to such vehicles whether they are provided or not with a vacuum brake system in which the vacuum is produced by means of a vacuum pump driven by the engine.

It is known that in a diesel engine, the variation of power is obtained by the quantitative proportioning of the gas-oil injected, the air intake being open to the atmosphere. The variation of pressure in the air-pipe varies according to the number of revolutions per minute of the engine and according to the rate of air flow in the pipe. But this variation is very slight as compared with that encountered in a gasoline engine and moreover occurs in the opposite direction.

Owing to this low value of the pressure variation, the connection of a vacuum servo-brake to the air intake pipe would not produce any result for a diesel engine.

It might have been possible to consider mounting a rotary vacuum pump on the engine, which would be a very costly solution, or eliminating the servo-brake, but in that case the braking would be very inefficient. The device according to the present invention is, on the contrary, simple, inexpensive and very efficient.

The principle of the device according to the invention consists in creating in the intake pipe of the diesel engine a similar vacuum to that encountered in a gasoline engine, without affecting the satisfactory operation of the engine. The desired vacuum is obtained by placing in the admission pipe a butterfly-valve which is adapted to be actuated by the brake pedal; of course the closing of the butterfly-valve is limited to allow of at least the minimum air intake required for the idling operation of the engine and only in the case of braking.

The braking device according to the present invention can be just as advantageously applied to improve the braking of any vehicles equipped with a vacuum system in which the vacuum is produced by means of a vacuum pump driven by the engine.

Such a system operates in the following manner: a vacuum pump driven by the engine produces a vacuum in a reservoir which acts as an accumulator; every time the brake is applied, the brake pedal opens a valve more or less which places the vacuum reservoir in communication with the vacuum servo-brake which directly actuates the brakes, the servo-brake acting to a certain extent as an amplifying relay.

Such a system would operate perfectly if the vacuum in the vacuum reservoir always had the same maximum value; but after the brake has been applied two or three times, said vacuum has decreased and the braking becomes less powerful and finally disappears; this is due to the fact that the requirements of the servo-brake are substantially greater than the output of the vacuum pump which does not have the necessary time, between the applications of the brake, to restore the vacuum in the reservoir.

The principle of the present invention consists in always retaining the same vacuum in the reservoir despite the requirements of the servo-brake; this is obtained by causing the diesel engine to operate as a high-output vacuum pump, without impairing the normal operation of the engine. In order to obtain the desired vacuum, a butterfly-valve adapted to be actuated by the brake pedal or its connecting rods is placed in the intake pipe of the engine, a spring being adapted to close said butterfly-valve quickly without limiting the travel of the pedal. The closing of the butterfly-valve produces a vacuum in the intake pipe; of course the closing of the butterfly-valve is limited to allow of at least the necessary air intake for the idling operation of the engine and only in the case of braking.

Just like the vacuum pump, the intake pipe is connected to the reservoir by a pipe provided with a non-return valve and its output is thus added in the reservoir to that of the vacuum pump.

The system operates as follows: when the engine is started, the vacuum pump alone creates a vacuum in the reservoir; every time the brake is applied, the brake pedal closes the butterfly-valve in the intake pipe and the vacuum thus created by the engine assists the vacuum pump and maintains the requisite vacuum in the reservoir despite the requirements of the servo-brake.

The vacuum in the reservoir is therefore always the same, whereby great reliability and evenness of braking are obtained.

Other features and advantages of the present invention will become apparent from the ensuing description made with reference to the accompanying drawings which show very diagrammatically and merely by way of example two possible embodiments of the device.

In these drawings:

Figs. 3 and 4 are similar to the previous figures but in the case in which the vehicle is already provided with a vacuum brake system.

Figure 1:
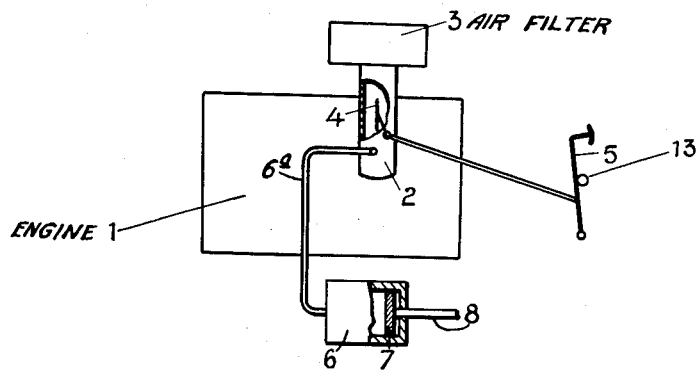
Figs. 1 and 2 show an embodiment of the invention, respectively during normal operation and during the braking period.
Figure 2:
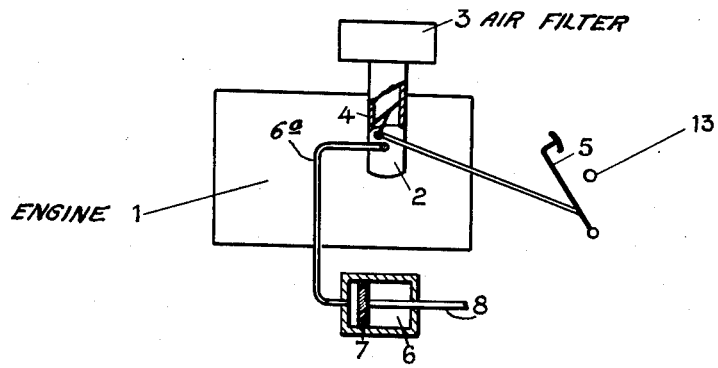

In Figs. 1 and 2, 1 diagrammatically represents the engine, 2 the air intake pipe, 3 an air filter, 4 the butterfly-valve which, according to the invention, is located in the intake pipe, 5 the foot-brake pedal and 13 its abutment, 6 the servo-brake, 7 the piston of the servo-brake and 8 the transmission device between the servo-brake and the brakes. A conduit 6a connects the air intake pipe 2 to the servo-brake 6.

At the instant when the engine is started, the vehicle is stationary and is braked by the hand-brake; the foot-brake pedal 5 is in its inoperative position against its abutment 13 and the air butterfly-valve 4 is completely open, as shown in Fig. 1; the engine starts normally with the air intake fully open.

During normal operation, the acceleration of the engine is always obtained by proportioning the gas-oil; since the foot-brake pedal 5 is in the inoperative position, the air butterfly-valve is open and the air intake is open to the atmosphere.

In order to apply the brake, the driver releases the accelerator and depresses the foot-brake pedal 5; the air butterfly-valve 4 closes as shown in Fig. 2; it is more or less closed according to the desired intensity of braking; the closing of the butterfly-valve creates a vacuum in the cylinder of the servo-brake; the piston 7 of the servo-brake returns from the extreme position shown in Fig. 1 to a position shown more to the left in Fig. 2, this position being the more to the left as the butterfly-valve is more completely closed. The movement of the piston 7 is transmitted to the brakes by means of the transmission device 8.

In the case in which the driver applies the maximum braking and disengages the clutch for stopping the vehicle, the engine continues to rotate at idling speed, the closing of the butterfly-valve having been limited in its minimum position so as to allow of a sufficient intake of air.

A description will now be given of the application of the invention to a vehicle which is already provided with a vacuum brake system, reference being had to Figs. 3 and 4 in which 1 diagrammatically represents the engine, 2 the air intake pipe, 3 an air filter, 4 the butterfly-valve which, according to the invention, is located in the intake pipe, 5 the foot-brake pedal and 13 its abutment, 6 the servo-brake, 7, the servo-brake piston, 8 the transmission device between the servo-brake and the brakes, 9 the vacuum pump, 10 the vacuum reservoir, 11 the air valve of the servo-brake and 12 and 12a non-return valves.

The valve 11 is connected by a linkage 14 to the brake pedal 5, which controls the butterfly valve 4 through the linkage 15, the latter being provided with spring means to return the pedal 5 to its normal position and the valve 4 to its normal fully open position. The non-return or one-way check valve 12 is operatively mounted in a conduit 16 that connects the vacuum pump 9 to the reservoir 10 and the valve 11 is installed in a conduit or pipe 17, which connects the reservoir 10 to the servo-brake cylinder. The non-return or one-way check valve 12a is installed in a conduit 18, which connects the air intake pipe 2 at a point on the downstream side of the butterfly valve 4 to the reservoir 10.

At the instant when the engine is started, the vehicle is stationary and is held by the hand-brake; the vacuum pump 9 creates a vacuum in the reservoir 10; the brake pedal 5 is in its inoperative position and the butterfly-valve 4 is completely open, the valve 11 is closed as shown in Fig. 3; the engine starts normally with the air intake fully open.

During normal operation, the acceleration of the engine is always effected by proportioning the gas-oil; since the foot-brake pedal 5 is in its inoperative position, the butterfly-valve is open and the air intake is open to the atmosphere.

In order to apply the brake, the driver releases the accelerator and depresses the foot-brake pedal 5; the valve 11 opens and the servo-brake acts: simultaneously, the butterfly-valve 4 closes as shown in Fig. 4 and the engine operates as a high-output vacuum pump, the output of which is added to that of the vacuum pump 9, so that the vacuum in the reservoir always remains the same despite the requirements of the servo-motor.

In the case in which the driver applies the maximum braking force and disengages the clutch for stopping the vehicle, the engine continues to rotate at idling speed, the closing of the butterfly-valve having been limited in its minimum position to allow of a sufficient air intake.

The first system described may be used with servo-brakes comprising a valve controlled by the brake pedal; in this particular case, the air butterfly-valve 4 instead of closing gradually when the brakes are applied, closes rapidly and the braking power is given by the valve 11.

With the device according to the invention, the vacuum brakes operate as efficiently as compressed air brakes and furthermore have the advantage of being less dangerous, less fragile and of absorbing less power from the engine.

I claim:

1. A braking device for a vehicle equipped with a diesel engine comprising in combination; a vacuum pump driven by the engine, a vacuum reservoir, conduit means connecting said pump with the reservoir, a non-return valve in said conduit means, said reservoir being in constant communication with said pump and built up thereby to its maximum storage capacity, a servo-brake cylinder, a conduit connecting said cylinder to the vacuum reservoir, a piston working in said servo-brake cylinder, a control member for the brakes of the vehicle connected to and actuated by said piston, a normally closed block valve arranged inside the conduit between the said vacuum reservoir and said servo-brake cylinder, a control pedal connected to the block valve to move progressively the same from its closed position to its open position and establish communication between the vacuum reservoir and the servo-brake cylinder so as to create a vacuum inside the servo-brake cylinder and thereby move the piston to actuate the brakes of the vehicle, means for maintaining the vacuum in the vacuum reservoir at its maximum during application of the brakes, said last means comprising an air intake pipe for the engine, a butterfly valve in said air intake pipe arranged so as to assume an open or closed position, said butterfly valve being normally in a fully open position and movable immediately to a closed position, in which latter position a quantity of air is still admitted which is just necessary for the idle running of the engine that then functions as a high discharge vacuum pump, a linkage connecting said control pedal to the butterfly valve so as to move the latter from its open position to its closed position upon actuation of the pedal and a pipe, provided with a check valve, connecting the air intake pipe of the engine, at a point on the downstream side of the butterfly valve, to the vacuum reservoir.

2. A braking device for use with a vehicle driven by a diesel engine comprising a vacuum pump driven by the engine, a vacuum reservoir constantly receiving the output of said pump, a servo-brake cylinder, a conduit connecting said reservoir to the cylinder, a piston working in said servo-brake cylinder, brake actuating means operated by said piston, a normally closed valve in said conduit, a control pedal connected to said valve for moving progressively the same from its closed position to an open position to establish communication between the vacuum reservoir and the cylinder so as to create a vacuum on one side of the piston to apply the brakes, means for maintaining the vacuum in the reservoir at its maximum value during application of the brakes, said last means comprising an air intake pipe for the engine, a butterfly valve in said air intake pipe arranged so as to assume an open or closed position, said butterfly valve being normally in a fully open position and being movable sharply to a closed position, in which latter position a small quantity of air such as is necessary for the idling of the engine is admitted, the engine during idling functioning as a high discharge vacuum pump, a linkage connecting said control pedal to the butterfly valve so as to close the latter when the valve in the conduit is opened and a pipe having a check valve connecting the air intake pipe, at a point downstream from the butterfly valve, to the vacuum reservoir.

3. In combination, a vehicle having a diesel engine and a braking device for said vehicle comprising a vacuum pump driven by said diesel engine, a vacuum reservoir, conduit means continuously connecting said pump with said reservoir for building up said reservoir to its maximum storage capacity, a non-return valve in said conduit means, a servo-brake cylinder, a conduit connecting said cylinder to said vacuum reservoir, a piston working in said cylinder, a control member for the brakes of the vehicle connected to and actuated by said piston, a normally closed block valve arranged inside the conduit between the said vacuum reservoir and said servo-brake cylinder, a control pedal connected to the block valve to move progressively the same from its closed position to its open position and establish communication between the vacuum reservoir and the servo-brake cylinder so as to create a vacuum inside the servo-brake cylinder and thereby move the piston to actuate the brakes of the vehicle, means for maintaining the vacuum in the vacuum reservoir at its maximum during application of the brakes.

said last means comprising an air intake pipe for the engine, a butterfly valve in said air intake pipe arranged so as to assume an open or closed position, said butterfly valve being normally in a fully open position and movable immediately to a closed position, in which latter position a quantity of air is still admitted which is just necessary for the idle running of the engine that then functions as a high discharge vacuum pump, a linkage connecting said control pedal to the butterfly valve so as to move the latter from its open position to its closed position upon actuation of the pedal, and a pipe, provided with a check valve, connecting the air intake pipe of the engine, at a point on the downstream side of the butterfly valve, to the vacuum reservoir.

References Cited in the file of this patent

UNITED STATES PATENTS

| | | |
|---|---|---|
| 1,741,818 | Bragg et al. | Dec. 31, 1929 |
| 1,849,113 | Porsche | Mar. 15, 1932 |
| 2,057,707 | Carroll | Oct. 20, 1936 |
| 2,142,514 | Jones | Jan. 3, 1939 |
| 2,376,937 | Pierotti | May 29, 1945 |

FOREIGN PATENTS

| | | |
|---|---|---|
| 299,026 | Great Britain | July 11, 1929 |